United States Patent
Jeon et al.

(10) Patent No.: US 12,206,082 B2
(45) Date of Patent: Jan. 21, 2025

(54) BATTERY MODULE AND MANUFACTURING METHOD THEREOF

(71) Applicant: LG Energy Solution, Ltd., Seoul (KR)

(72) Inventors: Jongpil Jeon, Daejeon (KR); Junyeob Seong, Daejeon (KR); Myungki Park, Daejeon (KR); Jonghwa Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 543 days.

(21) Appl. No.: 17/615,388

(22) PCT Filed: Feb. 4, 2021

(86) PCT No.: PCT/KR2021/001485
§ 371 (c)(1),
(2) Date: Nov. 30, 2021

(87) PCT Pub. No.: WO2021/210770
PCT Pub. Date: Oct. 21, 2021

(65) Prior Publication Data
US 2022/0231354 A1    Jul. 21, 2022

(30) Foreign Application Priority Data
Apr. 13, 2020   (KR) .................. 10-2020-0044877

(51) Int. Cl.
*H01M 10/6556* (2014.01)
*H01M 10/60* (2014.01)
(Continued)

(52) U.S. Cl.
CPC ..... *H01M 10/6556* (2015.04); *H01M 10/613* (2015.04); *H01M 10/6551* (2015.04);
(Continued)

(58) Field of Classification Search
CPC ............. H01M 50/271; H01M 50/244; H01M 50/204; H01M 50/298; H01M 50/258;
(Continued)

(56) References Cited

U.S. PATENT DOCUMENTS

2011/0293974 A1* 12/2011 Yoon .................. H01M 10/613
429/72
2015/0140366 A1    5/2015 Nicholls
(Continued)

FOREIGN PATENT DOCUMENTS

CN    104471783 A    3/2015
CN    107078365 A    8/2017
(Continued)

OTHER PUBLICATIONS

Extended European Search Report including Written Opinion for Application No. 21787562.4 dated Jul. 11, 2022, pp. 1-8.
(Continued)

*Primary Examiner* — Matthew W Van Oudenaren
(74) *Attorney, Agent, or Firm* — Lerner David LLP

(57) ABSTRACT

A battery module according to an embodiment of the present disclosure includes a battery cell stack in which a plurality of battery cells are stacked, a module frame for housing the battery cell stack, end plates for covering front and rear surfaces of the battery cell stack, and a cooling port configured to supply a refrigerant to a heat sink formed on a bottom part of the module frame, the module frame comprises a module frame protrusion part, which is extended and formed so as to pass through the end plates on the bottom part of the module frame, the cooling port is formed at an upper surface part of the module frame protrusion part, and the end plate comprises an end plate opening formed at a portion thereof corresponding to the cooling port and an insulator formed so as to cover the end plate opening.

10 Claims, 6 Drawing Sheets

(51) Int. Cl.
- *H01M 10/613* (2014.01)
- *H01M 10/6551* (2014.01)
- *H01M 10/6553* (2014.01)
- *H01M 10/6567* (2014.01)
- *H01M 10/6568* (2014.01)
- *H01M 10/658* (2014.01)
- *H01M 50/20* (2021.01)
- *H01M 50/204* (2021.01)
- *H01M 50/244* (2021.01)
- *H01M 50/258* (2021.01)
- *H01M 50/271* (2021.01)
- *H01M 50/298* (2021.01)
- *H01M 50/595* (2021.01)

(52) U.S. Cl.
CPC ....... *H01M 10/658* (2015.04); *H01M 50/271* (2021.01); *H01M 10/60* (2015.04); *H01M 10/6553* (2015.04); *H01M 10/6567* (2015.04); *H01M 10/6568* (2015.04); *H01M 50/20* (2021.01); *H01M 50/204* (2021.01); *H01M 50/244* (2021.01); *H01M 50/258* (2021.01); *H01M 50/298* (2021.01); *H01M 50/595* (2021.01)

(58) Field of Classification Search
CPC ............... H01M 50/20; H01M 50/595; H01M 10/6556; H01M 10/613; H01M 10/6551; H01M 10/658; H01M 10/6567; H01M 10/6568; H01M 10/6553; H01M 10/60
See application file for complete search history.

(56) References Cited

U.S. PATENT DOCUMENTS

| | | | |
|---|---|---|---|
| 2015/0280293 A1* | 10/2015 | Guignard | H01M 10/613 429/120 |
| 2016/0126514 A1 | 5/2016 | Suzuki et al. | |
| 2016/0149180 A1* | 5/2016 | Tokoo | H01M 10/613 429/154 |
| 2016/0164148 A1 | 6/2016 | Yum et al. | |
| 2016/0309617 A1 | 10/2016 | Kimoto | |
| 2018/0123198 A1 | 5/2018 | Fees et al. | |
| 2019/0173064 A1 | 6/2019 | Lee et al. | |
| 2019/0296294 A1 | 9/2019 | Hirschbeck et al. | |
| 2019/0348720 A1 | 11/2019 | Oh et al. | |
| 2019/0366876 A1 | 12/2019 | Cheadle et al. | |
| 2019/0389318 A1 | 12/2019 | Lee et al. | |
| 2020/0014005 A1 | 1/2020 | Lee et al. | |
| 2020/0067155 A1 | 2/2020 | Hwang et al. | |
| 2020/0091571 A1 | 3/2020 | Burgers et al. | |
| 2020/0106145 A1 | 4/2020 | Schmitt et al. | |

FOREIGN PATENT DOCUMENTS

| | | |
|---|---|---|
| CN | 207183461 U | 4/2018 |
| CN | 108832045 A | 11/2018 |
| CN | 208256773 U | 12/2018 |
| CN | 208538952 U | 2/2019 |
| CN | 109428019 A | 3/2019 |
| CN | 209217027 U | 8/2019 |
| CN | 110235274 A | 9/2019 |
| CN | 209487577 U | 10/2019 |
| CN | 210040348 U | 2/2020 |
| CN | 110911603 A | 3/2020 |
| GB | 2502977 A | 12/2013 |
| JP | 2014216298 A | 11/2014 |
| JP | 2015225703 A | 12/2015 |
| JP | 6254904 B2 | 12/2017 |
| JP | 2018-501603 A | 1/2018 |
| KR | 20060060817 A | 6/2006 |
| KR | 20160067711 A | 6/2016 |
| KR | 20170084699 A | 7/2017 |
| KR | 20180099438 A | 9/2018 |
| KR | 102002862 B1 | 7/2019 |
| KR | 20200021608 A | 3/2020 |
| WO | 2014/203342 A1 | 12/2014 |
| WO | 2018112619 A1 | 6/2018 |

OTHER PUBLICATIONS

International Search Report for Application No. PCT/KR2021/001485, dated Jun. 8, 2021, 3 pages.

* cited by examiner

[FIG. 1]
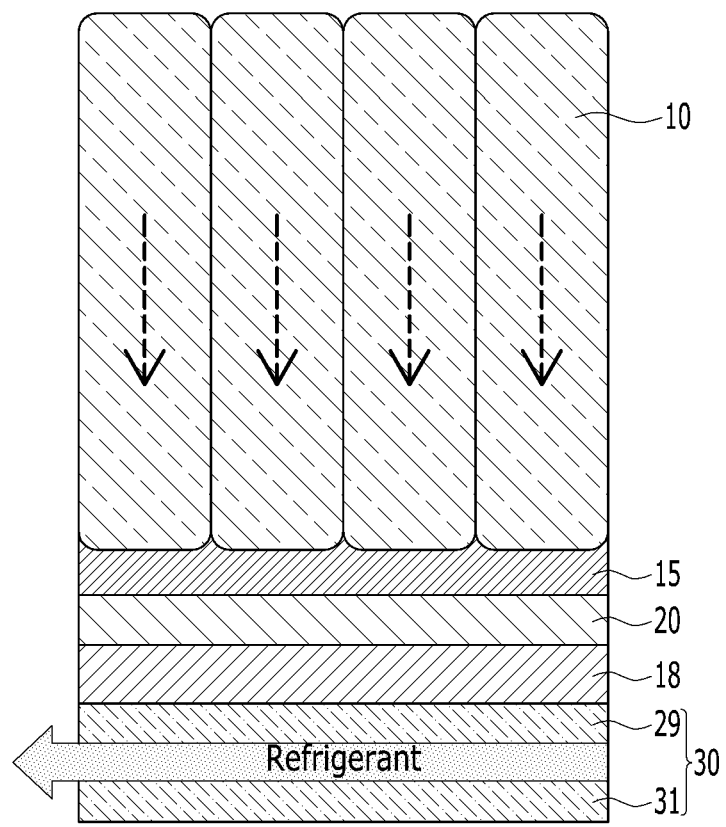

[FIG. 2]
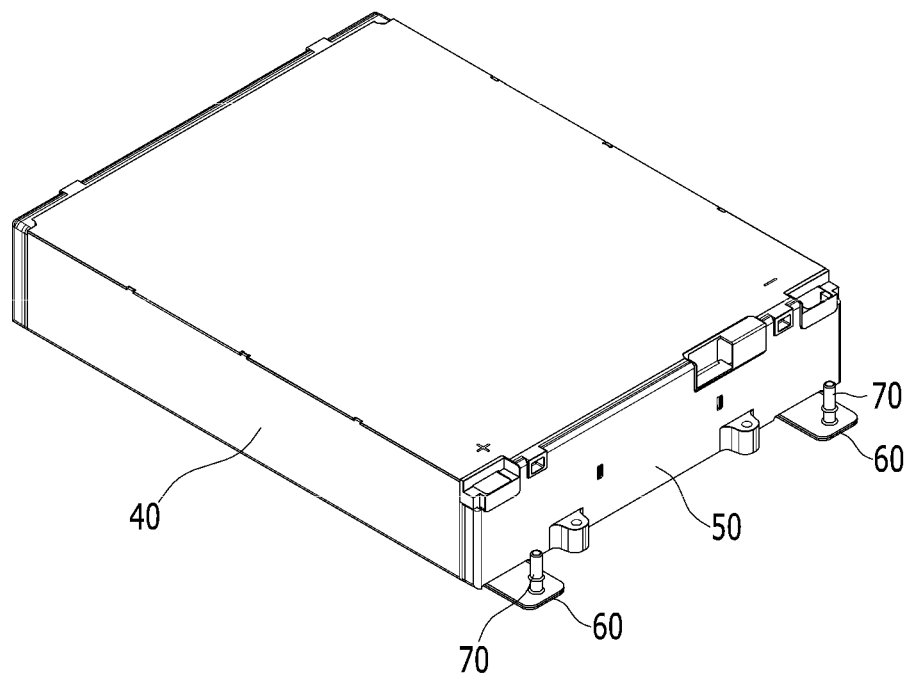
[FIG. 3]
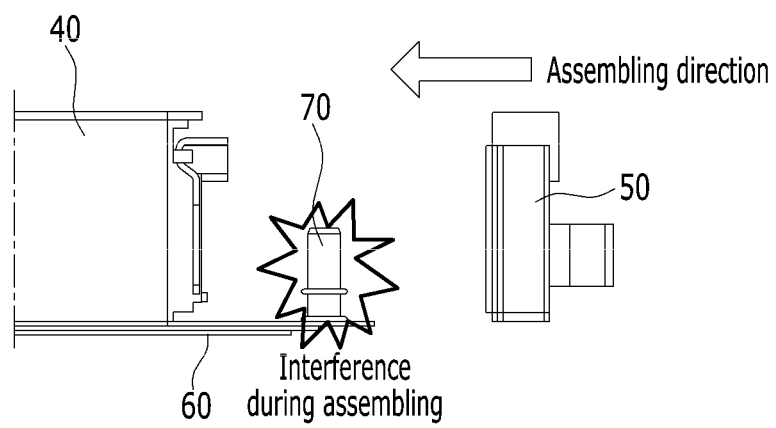

【FIG. 4】
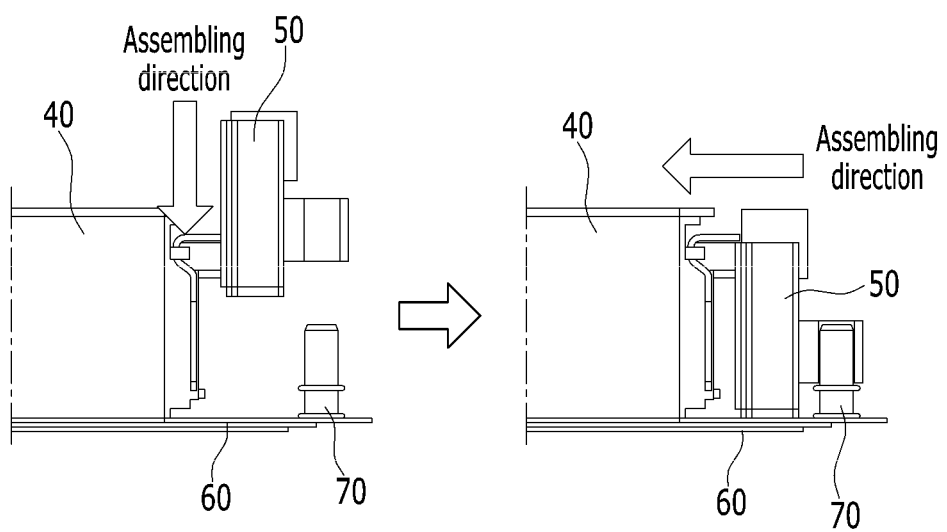

[FIG. 5]
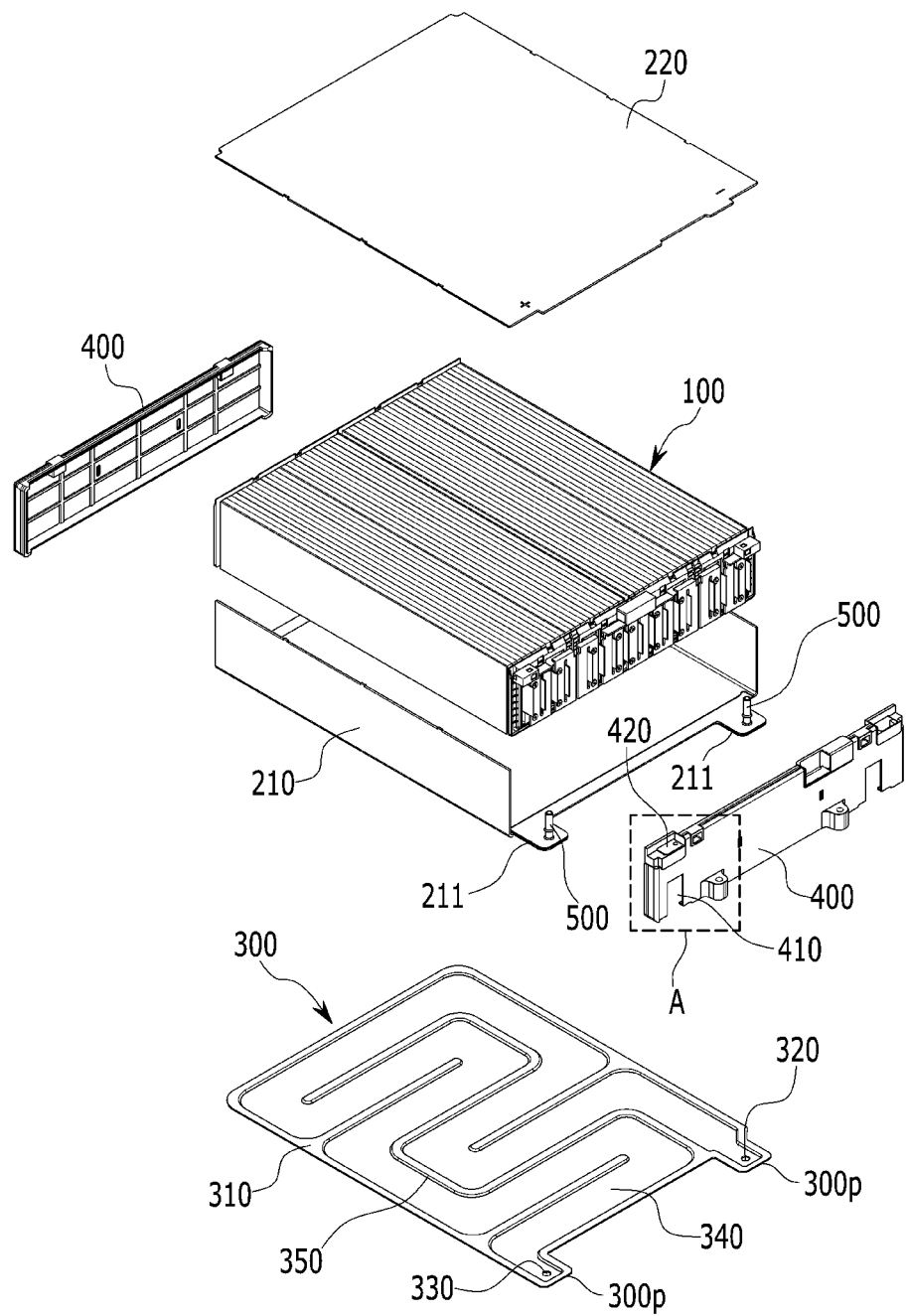

[FIG. 6]
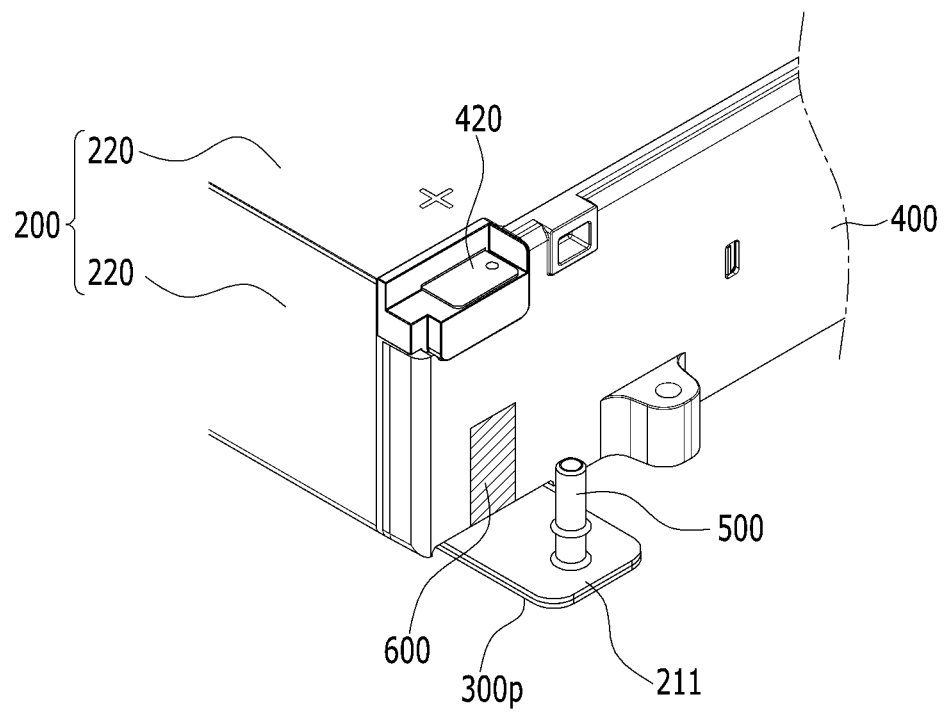
[FIG. 7]
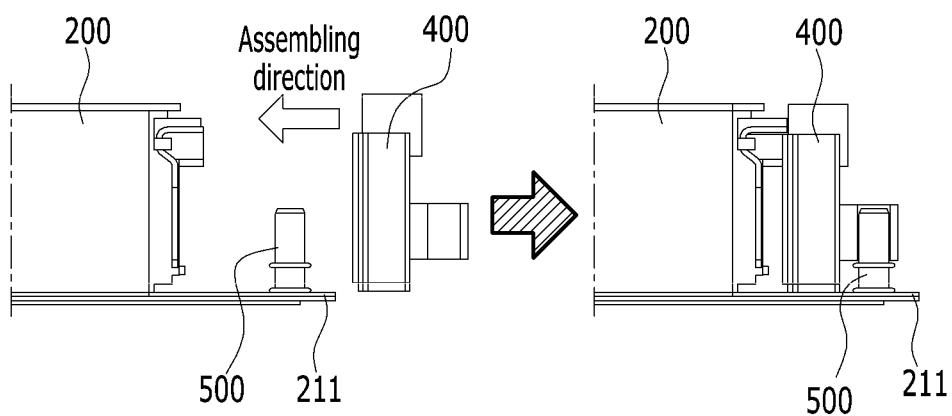

【FIG. 8】
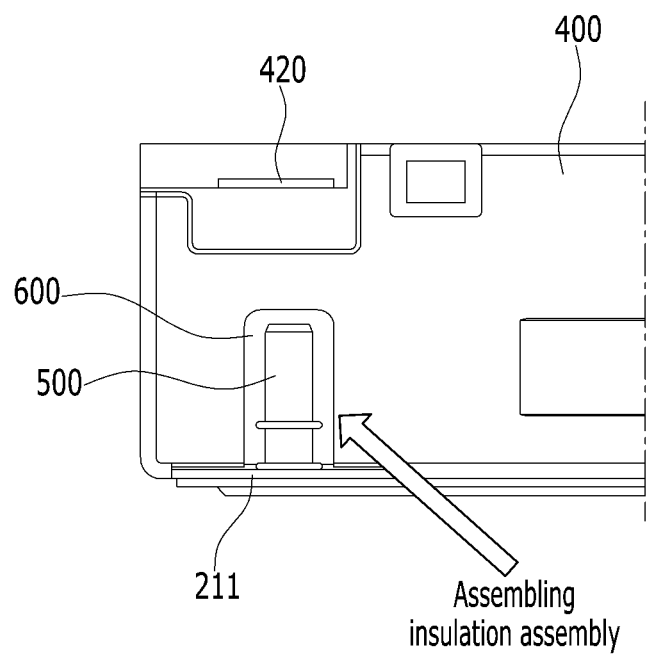

BATTERY MODULE AND MANUFACTURING METHOD THEREOF

CROSS-REFERENCE TO RELATED APPLICATION(S)

This application is a national phase entry under 35 U.S.C. § 371 of International Application No. PCT/KR2021/001485, filed on Feb. 4, 2021, published in Korean, which claims priority to Korean Patent Application No. 10-2020-0044877, filed on Apr. 13, 2020, the entire contents of which are hereby incorporated herein by reference.

TECHNICAL FIELD

The present disclosure relates to a battery module and a method for manufacturing the same, and more particularly to a battery module having a cooling structure, and a method for manufacturing the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of at least one battery cell first, and then configure a battery pack by using at least one of the battery modules and adding other components.

Such a battery module may include a battery cell stack in which a plurality of battery cells are stacked, a module frame for housing the battery cell stack, and a heat sink for cooling the plurality of battery cells.

FIG. 1 is a view illustrating a battery module coupled to a heat sink according to the related art.

Referring to FIG. 1, a conventional battery module includes a battery cell stack in which a plurality of battery cells 10 are stacked, a module frame for housing the battery cell stack, and a thermally conductive resin layer 15 located between the bottom part 20 of the module frame and the battery cell stack. Such a battery module can be formed under the bottom part 20 of the module frame and coupled with a heat sink 30 that provides a cooling function to a plurality of battery cells 10, thereby forming a battery pack. At this time, the heat sink 30 includes an inlet through which refrigerant flows in, an outlet through which refrigerant flows out, a lower plate 31 having a cooling flow path for connecting the inlet and the outlet, and an upper plate 29 for covering the lower plate 31. Here, a heat conductive layer 18 may be further formed between the bottom part 20 of the battery module and the heat sink 30.

Conventionally, in order to improve the cooling performance of the battery module and/or the battery pack, a separate cooling structure, for example, a heat sink 30, is required for each battery pack unit. Therefore, the cooling structure tended to be complicated, and the space between the refrigerant and the battery cell laminate 10 was formed by a multi-layered structure consisting of an upper plate 29, a module frame bottom part 20, and the like, whereby there was a limit that it has no choice but to cool the battery cells indirectly.

DETAILED DESCRIPTION OF THE INVENTION

Technical Problem

It is an object of the present disclosure to provide a battery module having improved assembling property of the cooling structure to improve cooling performance, and a method for manufacturing the same.

The objects of the present disclosure are not limited to the aforementioned objects, and other objects which are not described herein should be clearly understood by those skilled in the art from the following detailed description.

Technical Solution

According to one embodiment of the present disclosure, there is provided a battery module comprising: a battery cell stack in which a plurality of battery cells are stacked; a module frame for housing the battery cell stack; end plates for covering front and rear surfaces of the battery cell stack; and a cooling port configured to supply a refrigerant to a heat sink formed on a bottom part of the module frame, wherein the module frame comprises a module frame protrusion, which is extended and formed so as to pass through the end plates on the bottom part of the module frame, wherein the cooling port is formed at an upper surface part of the module frame protrusion, and wherein the end plate comprises an end plate opening formed at a portion thereof corresponding to the cooling port, and an insulator formed so as to cover the end plate opening.

A height of the end plate opening may be identical to or larger than a height of the cooling port.

The cooling port may be formed so as to be protruded on the upper surface of the module frame protrusion.

The module frame protrusion may be formed so as to extend in a vertical direction to a plate surface of the end plate, and the end plate opening may be formed at a portion that meets the module frame protrusion.

Terminal busbars may be formed on upper sides of both ends of the end plates, and the end plate opening may be formed at a portion at which the end plates meet the terminal busbars.

The insulator may be formed of an insulation tape, and a periphery of the insulation tape may be attached to a circumferential surface of the end plate opening to cover the end plate opening.

The battery module may further include a heat sink protrusion part, which is formed so as to correspond to the module frame protrusion.

According to another embodiment of the present disclosure, there is provided a battery pack comprising the battery module.

According to yet another embodiment of the present disclosure, there is provided a method for manufacturing a battery module, the method comprising the steps of: manufacturing an end plate in which an end plate opening is formed; moving the end plate such that the end plate opening passes through a cooling port located on a module frame protrusion, which is extended and formed from a bottom part of a module frame; coupling the end plate to the module frame; and assembling an insulator so as to cover the end plate opening.

In the step of coupling the end plate to the module frame, the end plate moves in a direction that is perpendicular to a surface formed by edges of front and rear surfaces of the module frame, and thus can be coupled to the module frame.

Advantageous Effects

According to the embodiments of the present disclosure, since there is no assembly feature interference between the cooling port and the end plate, the assembling process of the end plate can be simplified and the difficulty of assembly can be improved.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a view illustrating a battery module coupled to a heat sink according to the related art;

FIG. 2 is a view illustrating a battery module illustrated as a comparative example;

FIG. 3 is a view illustrating an interference due to a cooling port when assembling an end plate formed in FIG. 2;

FIG. 4 is a view illustrating a state in which the end plate of FIG. 3 is assembled away from the cooling port;

FIG. 5 is an exploded perspective view illustrating a battery module according to an embodiment of the present disclosure;

FIG. 6 is an enlarged view of part A of FIG. 5, which is a view illustrating a state in which an insulator is attached to an end plate opening of FIG. 5;

FIG. 7 is a view illustrating a state in which the end plate is assembled according to the embodiment of the present disclosure; and FIG. 8 is a view illustrating a state in which the insulator is assembled according to the embodiment of the present disclosure.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, movements, constitutional elements, parts or combinations thereof, but it should be understood that they do not preclude a possibility of existence or addition of one or more other features, numbers, steps, movements, constitutional elements, parts or combinations thereof.

Hereinafter, a battery module to which a cooling port is coupled according to an embodiment of the present disclosure will be described with reference to FIGS. 5 to 6.

FIG. 5 is an exploded perspective view illustrating the battery module according to the embodiment of the present disclosure. FIG. 6 is an enlarged view of part A of FIG. 5, which is a view illustrating a state in which an insulator is attached to an end plate opening of FIG. 5.

Referring to FIGS. 5 and 6, a battery module according to an embodiment of the present disclosure includes a battery cell stack 100 in which a plurality of battery cells are stacked, a module frame 200 for housing the battery cell stack 100, end plates 400 for covering front and rear surfaces of the battery cell stack 100, and a cooling port 500 for supplying a refrigerant to a heat sink 300 formed on a bottom part of the module frame 200. The module frame 200 includes a module frame protrusion 211, which is extended and formed so as to pass through the end plates 400 on the bottom part of the module frame. The cooling port 500 is formed at an upper surface part of the module frame protrusion 211. The end plate 400 includes an end plate opening 410 formed at a portion corresponding to the cooling port 500 and an insulator 600 formed so as to cover the end plate opening 410.

A battery cell according to the embodiment of the disclosure is a secondary battery, which may be configured of a pouch type secondary battery. The battery cell may be formed of a plurality of cells, and the plurality of battery cells may be stacked so as to be electrically connected to each other, thereby forming the battery cell stack 100. Each of the plurality of the battery cells may include an electrode assembly, a cell case, and an electrode lead protruding from the electrode assembly.

The module frame 200 houses the battery cell stack 100. According to an embodiment of the present disclosure, the module frame 200 may include a lower frame 210 for covering a lower surface and both side surfaces of the battery cell stack 100, and an upper plate 220 for covering an upper surface of the battery cell stack 100. The module frame 200 includes a module frame protrusion 211, which is extended and formed so as to pass through the end plates on the bottom part of the module frame. The cooling port 500 which will be described below may be seated on an upper side of the module frame protrusion part 211.

However, a structure of the module frame 200 is not limited thereto, and may be a mono frame shape surrounding four surfaces excluding the front and rear surfaces of the battery cell stack 100.

The battery module 200 according to the embodiment of the disclosure may further include end plates 400 for covering the front and rear surfaces of the battery cell stack 100. Through the above-mentioned module frame 200, the battery cell stack 100 housed inside the frame may be physically protected.

Referring to FIG. 5, a heat sink 300 may be formed at a lower part of the module frame 200. The heat sink 300 may include a lower plate 310 that forms a skeleton of the heat sink 300 and makes contact with the bottom part of the module frame 200, an inlet 320 that is formed on one side of the heat sink 300 to supply a refrigerant from the outside to the interior of the heat sink 300, an outlet 330 that is formed on one side of the heat sink and allows a refrigerant flowed inside the heat sink to be discharged to the outside of the heat sink, and a flow passage part 340 that connects the inlet 320 and the outlet 330 and allows the refrigerant to flow.

In detail, the flow passage part 340 may indicate a structure in which the lower plate 310 making contact with a lower surface of a lower frame 210 corresponding to the bottom part of the module frame 200 is formed to be recessed on a lower side. An upper side of the flow passage part 340 is opened, whereby a flow path is formed between the flow passage part 340 and the bottom part of the module frame 200, and thus the refrigerant can flow through the flow path. That is, the battery module 200 according to the embodiment of the disclosure may have an integrated type cooling structure, in which the bottom part of the module frame 200 functions to correspond to the upper plate of the heat sink 300.

Conventionally, a structure in which the refrigerant flows is separately formed on a lower side of the module frame, so that it has no choice but to cool the module frame indirectly and thus, the cooling efficiency is deteriorated. In addition, there was a problem that a separate refrigerant flow structure is formed, which reduces the space utilization of the battery module and the battery pack on which the battery module is mounted. However, according to the embodiment of the present disclosure, the structure in which the heat sink 300 is integrated at a lower part of the module frame 200 can be employed so as to allow the refrigerant to directly flow between the flow passage part 340 and the bottom part of the module frame 200, thereby increasing the cooling efficiency due to direct cooling. Moreover, through the structure in which the heat sink 300 is integrated with the bottom part of the module frame 200, the space utilization of the battery module and the battery pack on which the battery module is mounted can be further increased.

The lower plate 310 may be formed so as to correspond to the bottom part of the module frame 200. The bottom part of the module frame 200 may correspond to the bottom part of the lower frame 210, the lower plate 310 and the bottom part of the lower frame 210 can be coupled to each other through welding, and a rigidity of the entire battery module can be reinforced through the lower plate 310. The lower plate 310 and the bottom part of the lower frame 210 are sealed through welding, whereby the refrigerant can flow without leakage in the flow passage part 340 formed inside the lower plate 310.

Both the inlet 320 and the outlet 330 may be formed on one side of the heat sink 300. In more detail, both the inlet 320 and the outlet 330 may be formed on one side of the heat sink 300 that is formed at a portion at which the end plate 400 is located. The inlet 320 and the outlet 330 may be located at both ends of one side of the heat sink 300, respectively. The inlet 320 and the outlet 330 may be formed at locations corresponding to the module frame protrusion parts 211 so as to be connected to lower surface parts of the module frame protrusion parts 211. The heat sink 300 includes heat sink protrusion parts 300p formed so as to correspond to the module frame protrusion parts 211, and the inlet 320 and the outlet 330 may be located on the heat sink protrusion parts 300p, which is formed to protrude from one side of the heat sink 300.

The flow passage part 340 may be formed so as to cover the bottom part of the module frame 200 while being bent. The flow passage part 340 is formed in most of areas of the bottom part of the module frame 200 excluding a portion in which the lower plate 310 makes contact with the bottom part of the module frame 200, whereby all the parts of the battery cell stack 100, which are disposed so as to occupy most of areas of the bottom part of the module frame 200, can be uniformly cooled.

The portion at which the flow passage part 340 is bent may be formed of a curved surface. Accordingly, the portion at which a partition wall 350 is bent may also be formed of a curved surface. When angled edge portions are formed in the flow passage part 340, it is likely that a flow of the refrigerant will stagnate at the angled edge portions, thus increasing a temperature deviation and a pressure drop. In this regard, if the bending part is treated with curved surfaces as in the embodiment of the present disclosure, the flow of the refrigerant can be made naturally.

The cooling port 500 is connected to the upper surface of the module frame protrusion part 211 so that the refrigerant is supplied to the heat sink 300 through the module frame protrusion part 211. The cooling port 500 may be formed so as to be protruded on the upper surface of the module frame protrusion part 211. In more detail, a connection hole is formed on the module frame protrusion part 211 connected to the cooling port 500, and the connection hole may be connected to the inlet 320 and the outlet 330 of the heat sink 300. Accordingly, the refrigerant supplied through the cooling port 500 may sequentially pass through the connection hole formed on the module frame protrusion part 211 and the inlet 320 formed in the heat sink protrusion part 300p to be flowed into the interior of the heat sink 300. Further, the refrigerant that circulates in the interior of the heat sink 300 may sequentially pass through the outlet 330 formed in the heat sink protrusion part 300p and the connection hole formed in the module frame protrusion part 211 to be discharged to the outside through the cooling port 500.

The end plate opening 410 formed at the portion corresponding to the cooling port 500 is included on the end plate 400. The end plate opening 410 may be formed in a size by which the cooling port 500 can pass through. For example, a height of the end plate opening 410 may be identical to or larger than a height of the cooling port 500. Therefore, when the end plate 400 is assembled in the module frame 200, the end plate 400 can be assembled in a direction in which the cooling port 500 passes through. During the assembling, the end plate 400 is moved such that the cooling port 500 passes through the end plate opening 410, and thus, the end plate opening 410 may be formed so as to completely pass through the end plate body, without being partially blocked.

The module frame protrusion part 211 may be formed so as to extend in a vertical direction to a plate surface of the end plate 400, and the end plate opening 410 may be formed in the portion that meets the module frame protrusion part 211. Because the cooling port 500 is connected to the module frame protrusion part 211, the end plate opening 410 may be also formed such that a lower end of the end plate body is opened, and thus the lower end of the opening 410 may be formed so as to meet the module frame protrusion part 211. Further, the module frame protrusion part 211 is extended in a vertical direction to the plate surface of the end plate 400, thereby being assembled, without interference of the module frame protrusion part 211, in a direction that is perpendicular to the surface formed by edges of the module frame 200 to which the end plate 400 is coupled.

Terminal busbars 420 may be formed on upper sides of both ends of the end plates, and openings 410 of the end plates may be formed at portions corresponding to the terminal busbars 420.

The insulator 600 is formed so as to cover the end plate opening 410 formed at the portion corresponding to the cooling port 500. Because there is a danger that the busbar located in the interior of the end plate is exposed to the outside through the end plate opening 410, the insulator 600 can be assembled in the end plate opening 410 to interrupt the electrical connection of the inside and the outside of the battery module.

The insulator 600 according to an embodiment of the present disclosure may be formed of an insulation tape. A periphery of the insulation tape may be attached to the circumferential surface of the end plate opening 410 to cover the end plate opening 410. However, the type of the insulator 600 is not limited to the insulation tape, and it may be variously applied as materials or components which are capable of insulation.

Hereinafter, referring to FIGS. 5 to 8, a method for manufacturing a battery module to which ae cooling port is coupled according to an embodiment of the present disclosure will be described in comparison with a comparative example illustrated in FIGS. 2 to 4.

FIG. 2 is a view illustrating the battery module illustrated as a comparative example. FIG. 3 is a view illustrating an interference due to the cooling port when assembling the end plate formed in FIG. 2. FIG. 4 is a view illustrating a state in which the end plate of FIG. 3 is assembled away from the cooling port. FIG. 7 is a view illustrating a state in which the end plate is assembled according to an embodiment of the present disclosure. FIG. 8 is a view illustrating a state in which the insulator is assembled according to an embodiment of the present disclosure.

Referring to FIGS. 7 and 8, the method for manufacturing a battery module according to an embodiment of the present disclosure includes a step of manufacturing an end plate 400 in which an end plate opening 410 is formed, a step of coupling the end plate 400 to the module frame 200 by moving the end plate 400 such that the end plate opening 410 passes through a cooling port 500 (FIG. 7), and a step of assembling an insulator 600 so as to cover the end plate opening 410 (FIG. 8).

In the step of coupling the end plate 400 to the module frame 200, the end plate 400 moves in a direction that is perpendicular to a surface formed by edges of front and rear surfaces of the module frame 200, and thus can be coupled to the module frame.

Referring to FIGS. 2 to 4, a battery module according to a comparative example of the present disclosure may include a module frame 40 for housing the battery cell stack, end plates 50 for covering front and rear surfaces of the battery cell stack, a module frame protrusion part 60 protruded and formed from the bottom part of the module frame 40, and a cooling port 70 formed at an upper surface part of the module frame protrusion part 60.

Conventionally, the cooling port 70 is coupled to the module frame protrusion part 60 during manufacture of the module frame 40 to thereby assemble the end plate 50 in a state in which a module frame assembly is formed. Here, as illustrated in FIG. 3, when the end plate 50 is assembled in a direction that is perpendicular to an attached surface of the end plate, an interference may occur during assembling due to the cooling port 70 protruded upwards from the module frame protrusion part 60. Accordingly, in order to assemble the end plate 50, as illustrated in FIG. 4, the end plate 50 is moved in a lower side direction in which the module frame protrusion part 60 is located, while vertically standing towards a space between the cooling port 70 and the module frame 40, and then is again moved in a direction which is perpendicular to the attached surface of the end plate to thereby assemble the end plate 50.

As illustrated in FIG. 4, because the end plate 50 has to be assembled through two steps, there was problem that an assembly process becomes complicated and high transfer precision is required to couple the end plate 50 with the edge portions of the module frame 40.

Thus, the method for manufacturing a battery module according to an embodiment of the present disclosure can assemble the end plate 400 and the module frame 200 by only a process of providing the end plate 400 in which the end plate opening 410 having a size by which the cooling port 500 can pass through is formed at a location corresponding to the cooling port 500, and then moving the end plate 400 in a direction in which the end plate opening 410 the passes through the cooling port, whereby an assembly of two steps according to a comparative example can become unnecessary, the assembly process can become simple, and an assembly efficiency can be improved.

In addition, since a problem may occur in the insulation performance of the battery module due to reasons such as exposure of the busbar to the outside through the end plate opening 410, the insulation performance of the battery module can be secured by assembling the insulator 600 in the end plate opening 410 after completion of the assembly of the end plate 400.

The above-mentioned battery module can be included in the battery pack. The battery pack may have a structure in which one or more of the battery modules according to this embodiment are gathered, and packed together with a battery management system (BMS) and a cooling device that control and manage battery's temperature, voltage, etc.

The battery pack can be applied to various devices. These devices may be applied to transportation means such as an electric bicycle, an electric vehicle, a hybrid vehicle, but the present disclosure is not limited thereto and can be applied to various devices that can use the battery module, which also falls under the scope of the present disclosure.

Although the preferred embodiments of the present disclosure have been illustrated and described, the present disclosure is not limited to the above-described particular embodiments, various modifications can be made by those skilled in the art without departing from the scope and spirit as disclosed in the accompanying claims, and these modifications should not be understood separately from the scope and spirit of the invention.

DESCRIPTION OF REFERENCE NUMERALS

200: module frame
210: lower frame
211: module frame protrusion part
220: upper plate
300: heat sink
400: end plate
410: end plate opening
500: cooling port
600: insulator

The invention claimed is:

1. A battery module comprising:
   a battery cell stack in which a plurality of battery cells are stacked;
   a module frame housing the battery cell stack therein;
   end plates covering front and rear surfaces of the battery cell stack; and
   a cooling port configured to supply a refrigerant to a heat sink formed on a bottom part of the module frame,
   wherein the module frame comprises a module frame protrusion part extending from the bottom part of the module frame through an end plate opening of one of the end plates,
   wherein the cooling port is disposed at an upper surface part of the module frame protrusion part,
   wherein the one of the end plates comprises the end plate opening formed at a portion thereof adjacent to the cooling port, and an insulator covering the end plate opening, and
   wherein a periphery of the insulator extends along a boundary surface of the one of the end plates bordering the end plate opening to cover the end plate opening.

2. The battery module according to claim 1, wherein a height of the end plate opening in a first direction perpendicular to the upper surface part of the module frame protrusion part is identical to or larger than a height of the cooling port in the first direction.

3. The battery module according to claim 1, wherein the cooling port protrudes from the upper surface of the module frame protrusion part.

4. The battery module according to claim 1, wherein the module frame protrusion part contacts a plate surface of the one of the end plates, and the end plate opening is formed at a portion of the one of the end plates that contacts the module frame protrusion part.

5. The battery module according to claim 1, wherein terminal busbars are formed on upper sides of both ends of the one of the end plates, and the end plate opening is disposed at a portion of the one of the end plates at which the one of the end plates contacts one of the terminal busbars.

6. The battery module according to claim 1, wherein the insulator is formed of an insulation tape, and a periphery of the insulation tape is attached to the boundary surface of the one of the end plates.

7. A battery module, comprising:
   a battery cell stack in which a plurality of battery cells are stacked;
   a module frame housing the battery cell stack therein;
   end plates covering front and rear surfaces of the battery cell stack; and
   a cooling port configured to supply a refrigerant to a heat sink formed on a bottom part of the module frame,
   wherein the module frame comprises a module frame protrusion part extending from the bottom part of the module frame through an end plate opening of one of the end plates,
   wherein the cooling port is disposed at an upper surface part of the module frame protrusion part,
   wherein the one of the end plates comprises the end plate opening formed at a portion thereof adjacent to the cooling port, and an insulator covering the end plate opening, and
   wherein the heat sink includes a heat sink protrusion part that contacts the module frame protrusion part.

8. A method of manufacturing a battery module, the method comprising the steps of:
   manufacturing an end plate in which an end plate opening is formed;
   moving the end plate so that a cooling port located on a module frame protrusion part passes through the end plate opening, the module frame protrusion part formed from a bottom part of a module frame;
   coupling the end plate to the module frame; and
   assembling an insulator with the end plate so as to cover the end plate opening, a periphery of the insulator extending along a boundary surface of the end plate bordering the end plate opening to cover the end plate opening.

9. The method according to claim 8, wherein, during the step of coupling the end plate to the module frame, the end plate is moved in a direction that is perpendicular to a surface formed by edges of front and rear surfaces of the module frame, thereby coupling the end plate to the module frame.

10. A battery pack comprising the battery module according to claim 1.

* * * * *